United States Patent
You et al.

(10) Patent No.: US 8,725,867 B2
(45) Date of Patent: May 13, 2014

(54) METHOD AND SYSTEM FOR REPORTING THE POLICY INSTALLATION FAILURE

(75) Inventors: Jianjie You, Shenzhen (CN); Tong Rui, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 470 days.

(21) Appl. No.: 13/056,707

(22) PCT Filed: Dec. 24, 2008

(86) PCT No.: PCT/CN2008/002067
§ 371 (c)(1),
(2), (4) Date: Jan. 31, 2011

(87) PCT Pub. No.: WO2010/020083
PCT Pub. Date: Feb. 25, 2010

(65) Prior Publication Data
US 2011/0138235 A1 Jun. 9, 2011

(30) Foreign Application Priority Data
Aug. 20, 2008 (CN) .......................... 2008 1 0147532

(51) Int. Cl.
*G06F 15/173* (2006.01)
*H04L 12/24* (2006.01)
*G06F 11/00* (2006.01)

(52) U.S. Cl.
CPC .......... *H04L 41/069* (2013.01); *H04L 41/0806* (2013.01); *H04L 41/0869* (2013.01); *G06F 15/173* (2013.01); *G06F 11/00* (2013.01)
USPC ....................................................... 709/224

(58) Field of Classification Search
CPC .............. H04L 41/069; H04L 41/0806; H04L 41/0869; H04L 47/10; H04L 47/14; H04L 47/20; G06F 15/173; G06F 11/00
USPC ........... 709/20–202, 206, 226, 229, 231, 224; 726/1, 3; 370/468, 395.2, 395.21
See application file for complete search history.

(56) References Cited

U.S. PATENT DOCUMENTS 6,983,317 B1 * 1/2006 Bishop et al. .................. 709/223
7,155,514 B1 * 12/2006 Milford ......................... 709/225
(Continued)

FOREIGN PATENT DOCUMENTS

CN 1852158 10/2006
CN 1852537 10/2006
(Continued)

OTHER PUBLICATIONS

XP014056771—ETSI TS 183 060 v0.3.1 (Nov. 2007)—Telecommunications and Internet Converged Service and Protocols for Advanced Networking (TISPAN); Resource and Admission Control Subsystem (RACS); Re interface based on the DIAMETER protocol.*

(Continued)

*Primary Examiner* — Andrew Chriss
*Assistant Examiner* — Rasha Fayed
(74) *Attorney, Agent, or Firm* — Hunton & Williams LLP

(57) ABSTRACT

A method and a system are provided for reporting policy installation failures in the field of communications. The method and system enable the policy decision functional entity (PD-FE) to accurately obtain detailed information of policy installation failures of the policy enforcement functional entity (PE-FE), thus enhancing the efficiency of sending the next policy for installation. The method includes: when the installation of a policy sent from the PD-FE to the PE-FE is failed, the PE-FE generates a feedback message to be sent to the PD-FE, and the feedback message includes the error reason of the policy failed in installation.

11 Claims, 4 Drawing Sheets

(56) References Cited

U.S. PATENT DOCUMENTS

| | | | |
|---|---|---|---|
| 7,225,367 | B2 | 5/2007 | Hashem |
| 7,496,652 | B2 * | 2/2009 | Pezzutti ..................... 709/223 |
| 7,647,398 | B1 * | 1/2010 | Fan .............................. 709/224 |
| 8,059,533 | B2 * | 11/2011 | Andreasen et al. ........... 370/230 |
| 2003/0041291 | A1 | 2/2003 | Hashem et al. |
| 2004/0010586 | A1 * | 1/2004 | Burton et al. ................. 709/224 |
| 2004/0015579 | A1 * | 1/2004 | Cooper et al. ................ 709/223 |
| 2004/0034794 | A1 * | 2/2004 | Mayer et al. .................. 713/200 |
| 2005/0240670 | A1 * | 10/2005 | Cheng .......................... 709/227 |
| 2006/0041660 | A1 * | 2/2006 | Bishop et al. ................ 709/224 |
| 2008/0177994 | A1 * | 7/2008 | Mayer .............................. 713/2 |

FOREIGN PATENT DOCUMENTS

| | | |
|---|---|---|
| CN | 1863201 A | 11/2006 |
| CN | 101136799 | 3/2008 |
| CN | 101369909 | 2/2009 |

OTHER PUBLICATIONS

X S0013-014-0 (X.S0013-014-0 (TIA 873.014) "All-IP Core Network Multimedia Domain" Service Based Bearer Control—Ty Interface Stage 3, version 1.0, Dec. 2007.*

3GPP TS 29.212 v0.4.0 (Sep. 2006) "Policy and Charging Control over Gx reference point" (Release 7).*

3GPP TS 29.212 v0.4.0 (Sep. 2006)—Policy and Charging Control over Gx reference point (Release 7).*

Mainwaring ("Next Generation Network QoS Control Architectures and Protocols", ITU-T Workshop "NGN and its Transport Networks" Kobe, Apr. 20-21, 2006.*

X.S0013-014-0 (X.S0013-014-0 (TIA 873.014) "All-IP Core Network Multimedia Domain" Service Based Bearer Control—Ty Interface Stage 3, version 1.0, Dec. 2007.*

English Translation of the Written Opinion of the International Search Authority in international application No. PCT/CN2008/002067, mailed on Jun. 4, 2009.

Supplementary European Search Report in European application No. 08876771.0, mailed on Apr. 10, 2012.

Telecommunications and Internet Converged Services and Protocols for Advanced Networking (TISPAN); Resource and Admission Control Subsystem (RACS); Re interface based on the DIAMETER protocol, Nov. 2007.

Substituting COPS-PR: An Evaluation of NETCONF and SOAP for Policy Provisioning, 2006.

A Framework for End-to-End Differentiated Services QoS Context Transfer in Mobile IPv6, 2005.

COPS-SLS usage for dynamic policy-based QoS management over heterogeneous IP networks, Jun. 2003.

Proposition of a network policy management ontology, 2004.

International Search Report for International Application No. PCT/CN2008/002067, mailed Jun. 4, 2009.

* cited by examiner

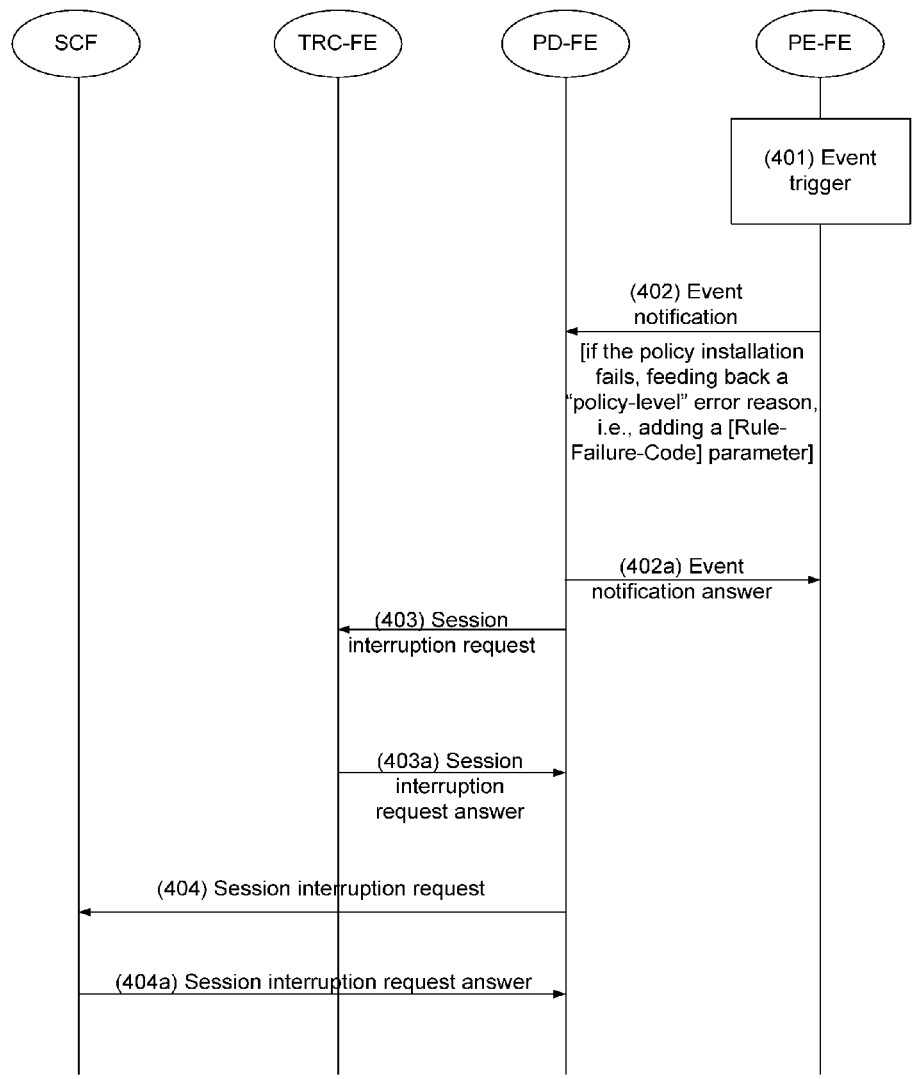

METHOD AND SYSTEM FOR REPORTING THE POLICY INSTALLATION FAILURE

CROSS-REFERENCE TO RELATED APPLICATIONS

This patent application is a U.S. national phase application of International Patent Application No. PCT/CN2008/002067, filed Dec. 24, 2008, which claims priority to China Patent Application No. 200810147532.2, filed Aug. 20, 2008, each of which is hereby incorporated by reference herein in its entirety.

TECHNICAL FIELD

The present disclosure relates to the field of communications, more specifically, to a method and system for tackling policy installation failures.

BACKGROUND

NGN (Next Generation Network) is a hot spot of research in the field of communication standards at present. It adopts IP or any other packet technology as a bearer network technology to make fixed communications and mobile communications converged. An NGN can provide more abundant multimedia services, for example, emerging services with real-time demands (such as VoIP, video conference, distance multimedia education and video-on-demand), which require the communication network to provide efficient end-to-end QoS (Quality of Service); and meanwhile, users are raising their demands on network QoS. Therefore, how to provide end-to-end QoS will become one of the core issues of an NGN.

ITU-T (International Telecommunication Union-Telecom) is the telecommunication standardization sector of ITU (International Telecommunication Union). It has formulated standards for resource and admission control. In the latest draft of RACF (Resource and Admission Control Functions) promulgated by ITU-T in May 2008, the functional architecture of RACF is provided, as shown in FIG. 1, the RACF consists of two parts: a PD-FE (Policy Decision Functional Entity) and a TRC-FE (Transport Resource Control Functional Entity).

The PD-FE has nothing to do with transmission technologies and SCF (Service Control Functions). The PD-FE makes a final decision on resource and admission control based on network policy rules, service information provided by the SCF, transport layer subscription information provided by NACF (Network Attachment Control Functions), and a resource availability decision result provided by the TRC-FE.

The TRC-FE has no relationship with services, but does with transmission technologies. The TRC-FE is responsible for collecting and maintaining transmission network information and resource status information. After receiving a resource request from the PD-FE, the TRC-FE executes resource-based admission control based on QoS, priority demands, resource availability information and transport-related policy rules.

The transport layer consists of a PE-FE (Policy Enforcement Functional Entity) and a TRE-FE (Transport Resource Enforcement Functional Entity). The PE-FE is a packet-to-packet gateway and may be located between a CPN (Customer Premises Network) and an access network, or between an access network and a core network, or between networks of different operators, and serves as a key node for supporting dynamic QoS control, port address translator control and NAT (Network Address Translator) transversal. The TRE-FE executes the transport resource policy rules sent from the TRC-FE, with the range and function thereof as well as an Rn interface remaining to be studied, and the study is not in the research scope in R2 stage.

PD-FE

The PD-FE is a policy decision functional entity. It makes a preliminary decision on QoS resources based on media stream session information (acquired from the SCF via an Rs interface), and transport resource subscription information of users (acquired from the NACF via an Ru interface), and then interacts with the TRC-FE to determine whether there are sufficient QoS resources, and finally makes a final admission decision and sends the decision to the PE-FE for execution.

TRC-FE

The TRC-FE is mainly responsible for resource control. It monitors resources in a network and collects related information, and makes a response according to a specific resource condition when the PD-FE requests resources.

PE-FE

The PE-FE mainly performs policy control (gate control, bandwidth, traffic classification and tagging, traffic shaping, layer 2 and layer 3 QoS mapping, and collection and reporting of resource-use information, etc) under the direction of the PD-FE.

TRE-FE

The TRE-FE is currently defined to execute a layer 2 policy under the direction of the TRC-FE, but the specific functions and scope are yet to be determined.

A resource request process in PUSH mode in the prior art is shown in FIG. 2. The process includes the following steps:

(201) SCF receives or generates a service signaling message which triggers the SCF to generate a resource initialization request;

(202) the SCF sends a resource initialization request message to a PD-FE, to request authorization and reservation of QoS resources, wherein the message includes a media stream description, QoS parameters and other information;

(203) the PD-FE authorizes the requested QoS resources, i.e. checking whether the requested resources are consistent with policy rules of local operators and transport subscription information in NACF;

(204) if the authorization check is passed, the PD-FE locates and determines the access network and core network the media stream involves in, and moreover, the PD-FE interacts with a TRC-FE, and checks the resource availability of the involved networks;

(205) the PD-FE makes a final admission decision based on Step (203) and Step (204);

(206) if the final admission decision is passed, the PD-FE will send a policy installation message to a PE-FE;

(207) the PE-FE sends a policy install answer message to the PD-FE to confirm installation; and (208) the PD-FE sends a resource initialization answer to notify the SCF.

In Step 206, the policy installation message sent from the PD-FE to the PE-FE may include a plurality of policies. If an error occurs in the installation of some policies, then the policy install answer message in Step 207 will include the names and status of the error policies, that is to say, if an error occurs in the installation of some policies, the policy install answer message will only give a message-level error reason. Typically, it is expressed with a [Experimental-Result] parameter.

In the prior art, a policy installation condition is expressed with the following parameters in the PIA (Policy Install Answer) message:

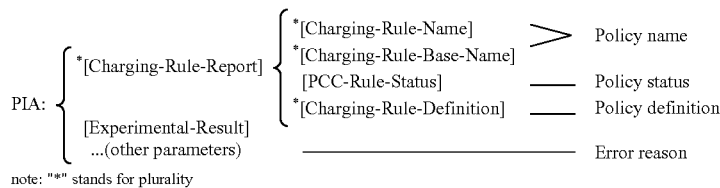

note: "*" stands for plurality

In this case, a coarse-grained (message-level) error reason is reported. This is not favorable for accurate acquisition by the PD-FE of the detailed information of the policy installation enforced by the PE-FE.

SUMMARY

The technical problem the present disclosure aims to solve is to provide a method and system for reporting policy installation failures, which help a PD-FE accurately obtain detailed information of policy installation failures in a PE-FE, thus enhancing the efficiency of installation of the next policy to be sent.

In order to solve the foregoing technical problem, the present disclosure provides a method for reporting policy installation failures. The method comprises: when the installation of policies sent from a PD-FE to a PE-FE is failed, the PE-FE generates a feedback message to be sent to the PD-FE, wherein the message includes error reasons of the policy installation failures.

Further, the foregoing method may also have the following character: the feedback message may be a PIA message or a CCR message.

Further, the foregoing method may also have the following character: during a resource request process or a modification process in PUSH mode, the PE-FE may install the policies, and if the policy installation is failed, a policy-error-reason parameter may be added to the PIA message that is to be sent to the PD-FE over an Rw interface; otherwise, the policy-error-reason parameter may not be added.

Further, the foregoing method may also have the following character: during a resource release process, if the policy installation enforced by the PE-FE is failed, a policy-error-reason parameter may be added to the CCR message that is to be sent to the PD-FE over an Rw interface; otherwise, the policy-error-reason parameter may not be added.

Further, the foregoing method may also have the following character: the policy error reason may be added to a charging-rule-report parameter.

Further, the foregoing method may also have the following character: the charging-rule-report parameter may also include the following parameters: policy name, policy status and policy definition.

Further, the foregoing method may also have the following character: the charging-rule-report parameter may include a policy error reason and one or more policy names.

Further, the foregoing method may also have the following character: an error reason table is established in the PD-FE and the PE-FE, with each error reason corresponding to a reason value; if the installation of policies sent from the PD-FE to the PE-FE is failed, the PE-FE may add reason values of the installation failures to the feedback message; and the PD-FE may get the error reason of each specific policy failed in installation by referring to the error reason table after receiving the reason values.

In order to solve the foregoing technical problem, the present disclosure also provides a system for reporting policy installation failures. The system comprises a PD-FE and a PE-FE, wherein the PD-FE is used for sending a policy to the PE-FE;

the PE-FE is used for sending a feedback message to the PD-FE to confirm installation, and if the policy installation is failed, the feedback message includes error reasons of policies failed in installation.

Further, the feedback message may be a PIA message or a CCR message.

If errors occur in a plurality of policies and only a general error reason is feed back to the PD-FE, the PD-FE is unable to specifically tackle the problem of each policy. By contrast, when the method provided by the present disclosure is adopted, an error reason of each policy whose installation fails is given, i.e. a finer-grained error reason is given, which is a policy-level error reason. When errors occur in the installation of a plurality of policies, the method helps the PD-FE get accurate error reason of each policy failed in installation enforced by the PE-FE. In this way, when the next policy is sent for installation, the policy will be specifically tackled to avoid the same error from occurring again, therefore the effectiveness of the next policy installation can be guaranteed and the efficiency of sending the next policy for installation can be raised. This method is particularly effective when errors occur in the installation of a plurality of policies.

BRIEF DESCRIPTION OF THE DRAWINGS

FIG. 4 is an illustration of a resource release process according to a method provided by the present disclosure.

DETAILED DESCRIPTION

Below the technical solution of the present disclosure is described in details in combination with the accompanying drawings.

The main idea of the present disclosure is: when the installation of policies sent from a PD-FE to a PE-FE is failed, the PE-FE will report the error reason of each specific policy failed in installation to the PD-FE, specifically comprising:

(1) modifying a [Charging-Rule-Report] parameter in a PIA message on an Rw interface, with adding a [Rule-Failure-Code] parameter to this parameter, i.e.

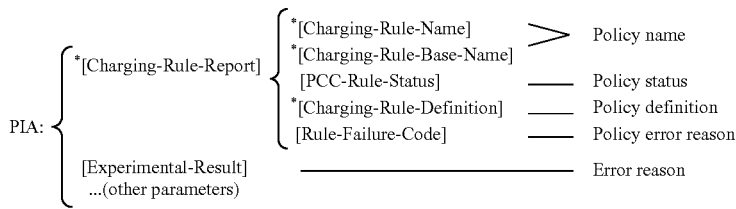

note: "*" stands for plurality the [Charging-Rule-Report] parameter in the PIA message is used for feeding back the policy installation condition in the PE-FE. The [Charging-Rule-Name] and the [Charging-Rule-Base-Name] stand for a policy name. The [PCC-Rule-Status] stands for a policy status. If the installation of a certain policy is failed, the error reason of the policy installation, i.e. [Rule-Failure-Code], is also fed back.

(2) modifying a [Charging-Rule-Report] parameter in an event notification message (CCR) on an Rw interface, with adding a [Rule-Failure-Code] parameter to this parameter, i.e.

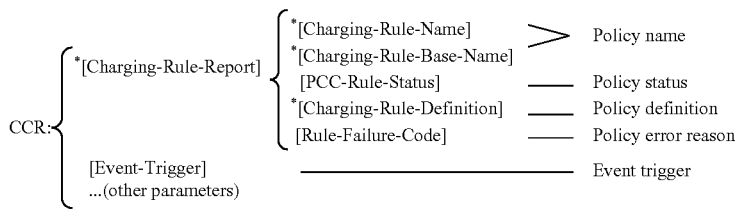

note: "*" stands for plurality if the same reason results in installation failures of a plurality of policies, it may be reported through one [Charging-Rule-Report], wherein each of such [Charging-Rule-Report] includes one policy error reason and a plurality of policy names. If reasons of the installation failures vary with policies, the reasons may be reported through a plurality of [Charging-Rule-Report], wherein each [Charging-Rule-Report] includes a policy error reason and one or more corresponding policy names.

A system for reporting policy installation failures according to the present disclosure comprises a PD-FE and a PE-FE, wherein the PD-FE is used for sending a policy to the PE-FE;

the PE-FE is used for sending a feedback message to the PD-FE to confirm installation, and if the policy installation is failed, then the feedback message includes error reasons of policies failed in installation.

The feedback message is a PIA message or a CCR message.

Figure 1:
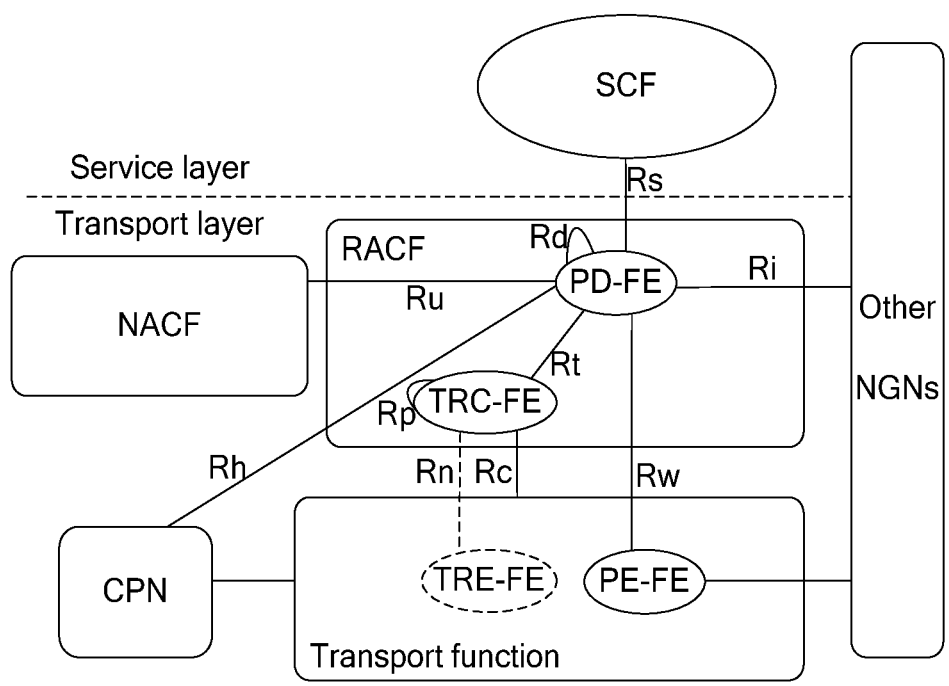
FIG. 1 is a functional architecture diagram of RACF of ITU-T in the prior art.
Figure 2:
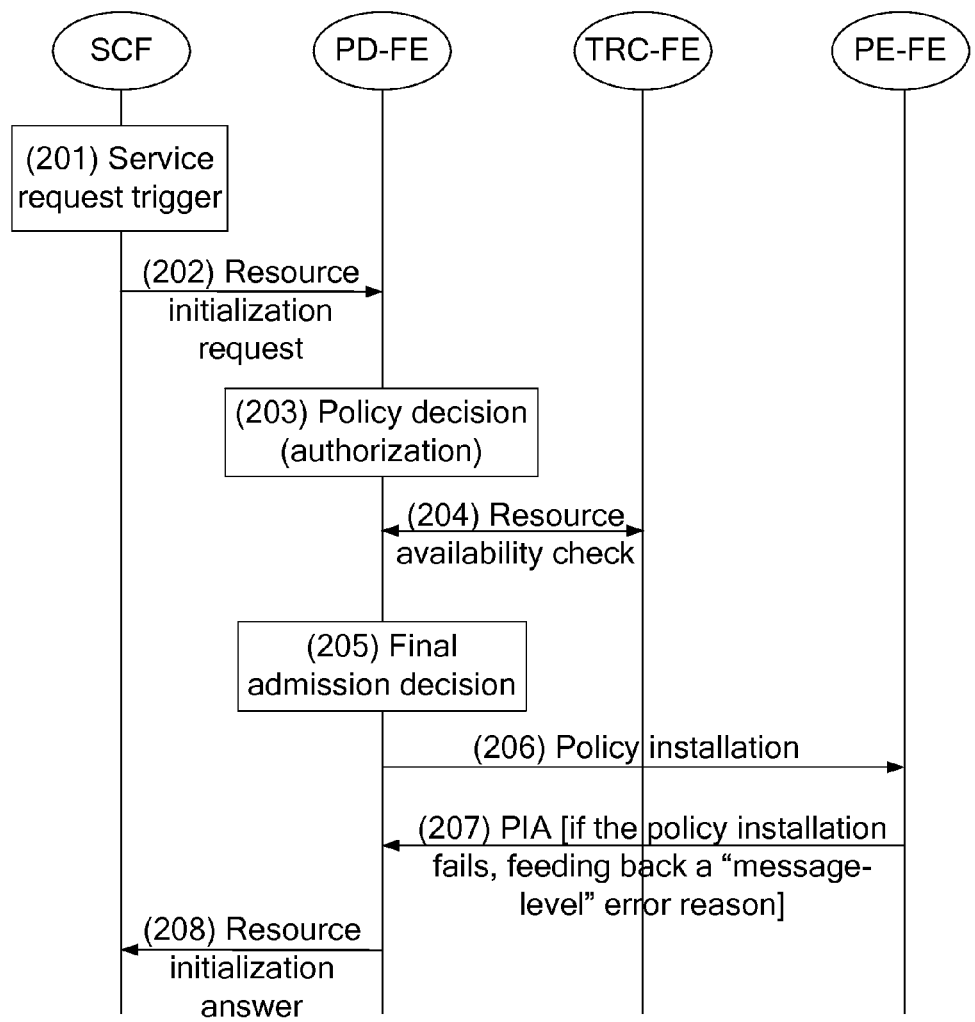
FIG. 2 is an illustration of a resource request process in PUSH mode in the prior art.
Figure 3:
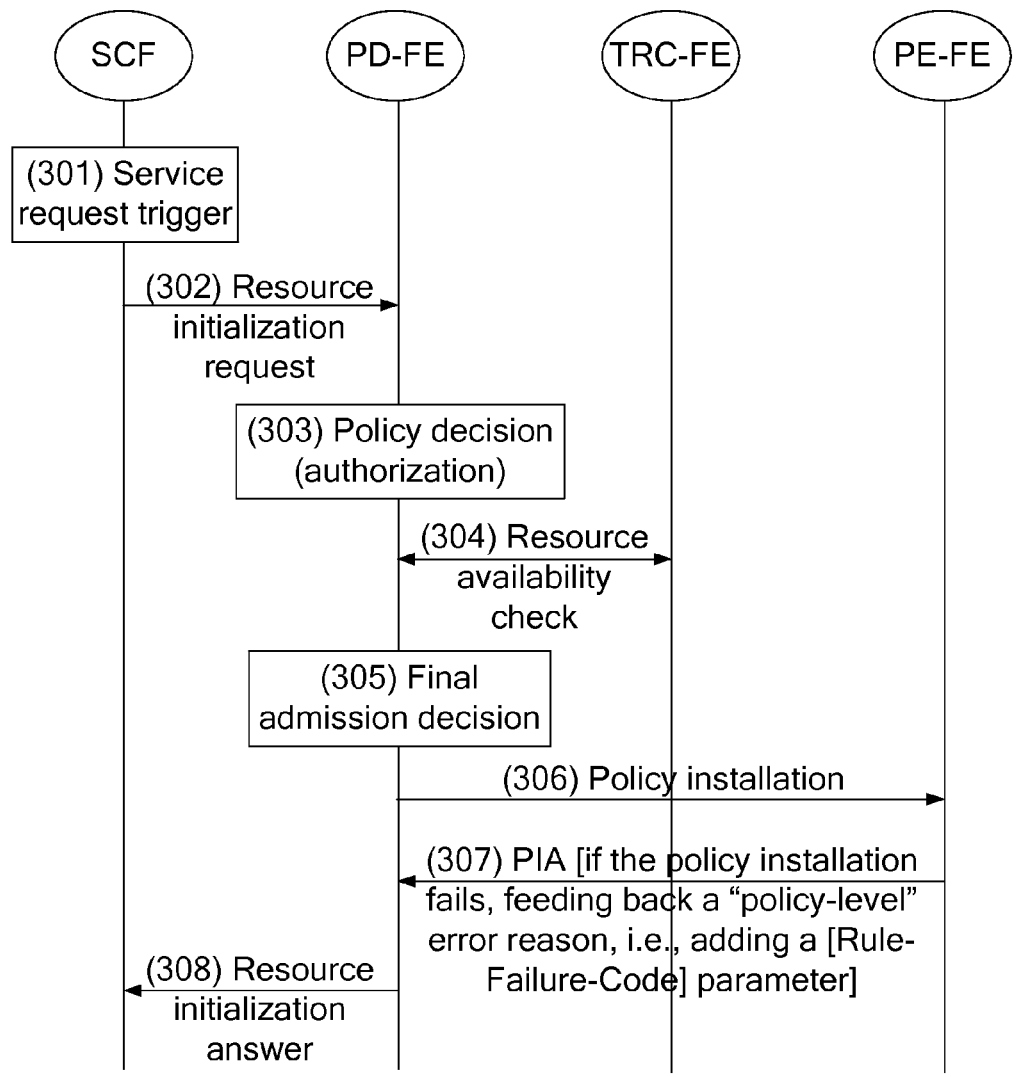
FIG. 3 an illustration of a resource request process in PUSH mode according to a method provided by the present disclosure.

A resource request process in PUSH mode in this embodiment is shown in FIG. 3 and includes the following steps:

(301) SCF receives or generates a service signaling message which triggers the SCF to generate a resource initialization request;

(302) the SCF sends a resource initialization request message to a PD-FE, to request authorization and reservation of QoS resources, wherein the message includes a media stream description, QoS parameters and other information;

(303) the PD-FE authorizes the requested QoS resources, i.e. checking whether the requested resources are consistent with policy rules of local operators and transport subscription information in NACF;

(304) if the authorization check is passed, the PD-FE locates and determines the access network and core network the media stream involves in, and moreover, the PD-FE interacts with a TRC-FE, and checks the resource availability of the involved networks;

(305) the PD-FE makes a final admission decision based on Step (303) and Step (304);

(306) if the final admission decision is passed, the PD-FE will send a policy installation message to a PE-FE;

(307) the PE-FE sends a PIA message to the PD-FE to confirm installation;

the PD-FE may send one or more policies to the PE-FE once; if policy installation failures exist, the installation failure reason of each specific policy failed in installation will be reported;

specifically, the installation failure reasons may be expressed with a [Rule-Failure-Code] parameter and this parameter is included in a [Charging-Rule-Report] parameter, shown as follows:

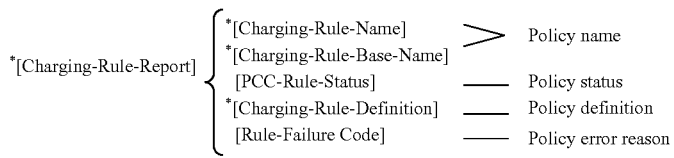

note: "*" stands for plurality the [Charging-Rule-Report] parameter in the PIA message is used for feeding back the policy installation condition in the PE-FE; after the [Rule-Failure-Code] parameter is added to this parameter, the installation failure reason of each specific policy failed in installation may be reported;

during concrete realization, an error reason table may be established in the PD-FE and the PE-FE in advance, the table includes reasons of errors that may appear, with each error reason corresponding to a reason value; when the installation of policies sent from the PD-FE to the PE-FE is failed, the PE-FE will report reason values of the installation failures through the PIA, and the PD-FE may get the installation failure reason of each specific policy failed in installation by referring to the error reason table;

(308) the PD-FE sends a resource initialization answer to inform the SCF.

A resource release process in this embodiment is shown in FIG. 4 and includes the following steps:

(401) if an event trigger occurs in the PE-FE, errors may occur in the installation of some policies;

(402) the PE-FE sends an event notification message, i.e. a CCR message, to the PD-FE;

if the installation of some policies is failed, then the PE-FE reports detailed information to the PD-FE, i.e. reporting the installation failure reason of each specific policy failed in installation;

specifically, the installation failure reasons may be expressed with a [Rule-Failure-Code] parameter and this parameter is included in a [Charging-Rule-Report] parameter, shown as follows:

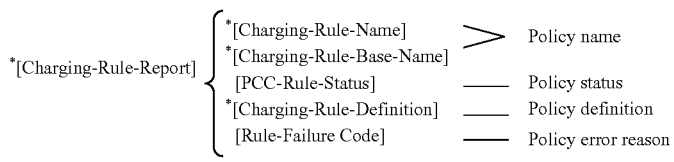

note: "*" stands for the [Charging-Rule-Report] parameter in the CCR is used for feeding back the policy installation condition in the PE-FE; after the [Rule-Failure-Code] parameter is added to this parameter, the PE-FE may report the installation failure reason of each specific policy failed in installation;

(402a) the PD-FE returns an event notification answer to the PE-FE;

(403) the PD-FE sends a session interruption request message to the TRC-FE;

(403a) the TRC-FE returns a session interruption request answer to the PD-FE;

(404) the PD-FE sends a session interruption request message to the SCF;

Step (404) and Step (403) are not necessarily performed in sequence; and (404a) the SCF returns a session interruption request answer to the PD-FE.

In addition to the foregoing flow, the method of the present disclosure may also be applied to report failure reasons in other flows of sending policies for installation, for example in a modification flow similar to the request flow, where a policy install request (PIR) command is used for sending an updated policy and a PIA command is used for reporting a failure reason.

Of course, the present disclosure may also have a plurality of other embodiments. Those skilled in the art may make various changes and modifications according to the present disclosure without departing from the spirit and essence of the present disclosure, and the changes and modifications all shall belong to the protection scope of the claims of the present disclosure.

Industrial Applicability

In the method of the present disclosure, each policy whose installation fails is given an error reason, i.e. a finer-grained policy-level error reason, this helps a PD-FE get accurate error reason of each specific policy failed in installation enforced by a PE-FE when errors occur in the installation of a plurality of policies. In this way, when the next policy is sent for installation, the policy will be specifically tackled, thus avoiding the same error from occurring again, furthermore, guaranteeing the effectiveness of the next policy installation and improving the efficiency of sending the next policy for installation. This method is particularly effective when errors occur in the installation of a plurality of policies.

What is claimed is:

1. A method for reporting policy installation failures, comprising:
   when the installation of policies sent from a policy decision functional entity (PD-FE) to a policy enforcement functional entity (PE-FE) is failed, the PE-FE generating a feedback message to be sent to the PD-FE,
   wherein a policy error reason for each policy installation failure is included in the feedback message, and the policy error reason is included in a charging-rule-report parameter,
   wherein error reasons of multiple-policy installation failure which are the same are reported via one policy-rule-report parameter, each of the policy-rule-report parameters includes one policy error reason and multiple policy names; and error reasons of multiple-policy installation failure which are not the same are reported via multiple policy-rule-report parameters, each of the policy-rule-report parameters includes one policy error reason and one or more corresponding policy names.

2. The method of claim 1, wherein the feedback message is a policy install answer (PIA) message or an event notification (CCR) message.

3. The method of claim 2, wherein during a resource request process or a modification process in PUSH mode, the PE-FE installs the policies, and if the policy installation is failed, a policy-error-reason parameter is added to the PIA message that is to be sent to the PD-FE over an Rw interface; otherwise, the policy-error-reason parameter is not added.

4. The method of claim 2, wherein during a resource release process, if the policy installation enforced by the PE-FE is failed, a policy-error-reason parameter is added to the CCR message that is to be sent to the PD-FE over an Rw interface; otherwise, the policy-error-reason parameter is not added.

5. The method of claim 1, wherein the charging-rule-report parameter also includes the following parameters: policy name, policy status and policy definition.

6. The method of claim 1, wherein
an error reason table is established in the PD-FE and the PE-FE, with each error reason corresponding to a reason value;
if the installation of policies sent from the PD-FE to the PE-FE is failed, the PE-FE adds reason values of the installation failures to the feedback message;
the PD-FE gets the error reason of each specific policy failed in installation by referring to the error reason table after receiving the reason values.

7. The method of claim 2, wherein
an error reason table is established in the PD-FE and the PE-FE, with each error reason corresponding to a reason value;
if the installation of policies sent from the PD-FE to the PE-FE is failed, the PE-FE adds reason values of the installation failures to the feedback message;
the PD-FE gets the error reason of each specific policy failed in installation by referring to the error reason table after receiving the reason values.

8. The method of claim 3, wherein
an error reason table is established in the PD-FE and the PE-FE, with each error reason corresponding to a reason value;
if the installation of policies sent from the PD-FE to the PE-FE is failed, the PE-FE adds reason values of the installation failures to the feedback message;
the PD-FE gets the error reason of each specific policy failed in installation by referring to the error reason table after receiving the reason values.

9. The method of claim 4, wherein
an error reason table is established in the PD-FE and the PE-FE, with each error reason corresponding to a reason value;
if the installation of policies sent from the PD-FE to the PE-FE is failed, the PE-FE adds reason values of the installation failures to the feedback message;
the PD-FE gets the error reason of each specific policy failed in installation by referring to the error reason table after receiving reason values.

10. A system for reporting policy installation failures, comprising:
a policy decision functional entity (PD-FE) for sending a policy to a policy enforcement functional entity (PE-FE); and
a PE-FE for sending a feedback message to the PD-FE to confirm installation,
wherein the feedback message includes a policy installation failure if the policy installation is failed, and the policy error reason is included in a charging-rule-report parameter,
wherein error reasons of multiple-policy installation failure which are the same are reported via one policy-rule-report parameter, each of the policy-rule-report parameters includes one policy error reason and multiple policy names; and error reasons of multiple-policy installation failure which are not the same are reported via multiple policy-rule-report parameters, each of the policy-rule-report parameters includes one policy error reason and one or more corresponding policy names.

11. The system of claim 10, wherein the feedback message is a policy install answer (PIA) message or an event notification (CCR) message.

* * * * *